US007082416B2

(12) United States Patent
Anderson

(10) Patent No.: US 7,082,416 B2
(45) Date of Patent: Jul. 25, 2006

(54) METHOD OF USING PREPAID CASH CARD FOR MAKING PURCHASES ON THE WORLD WIDE WEB

(76) Inventor: Karyn Elaine Anderson, 29381 Begonias La., Canyon Country, CA (US) 91351

( * ) Notice: Subject to any disclaimer, the term of this patent is extended or adjusted under 35 U.S.C. 154(b) by 693 days.

(21) Appl. No.: 10/021,620

(22) Filed: Dec. 11, 2001

(65) Prior Publication Data
US 2002/0147662 A1    Oct. 10, 2002

Related U.S. Application Data

(60) Provisional application No. 60/282,382, filed on Apr. 6, 2001.

(51) Int. Cl.
*G06Q 99/00* (2006.01)
*H04L 9/00* (2006.01)

(52) U.S. Cl. .............................. 705/74; 705/64; 705/78; 235/380

(58) Field of Classification Search ................. 705/64, 705/72, 74, 77, 78; 235/380
See application file for complete search history.

(56) References Cited

U.S. PATENT DOCUMENTS

| 4,386,266 | A | * | 5/1983 | Chesarek ..................... 705/72 |
| 4,706,275 | A | | 11/1987 | Kamil ..................... 379/114.2 |
| 5,749,075 | A | | 5/1998 | Toader et al. ................. 705/14 |
| 5,774,869 | A | | 6/1998 | Toader ........................ 705/10 |
| 5,806,043 | A | | 9/1998 | Toader ........................ 405/14 |
| 5,915,007 | A | | 6/1999 | Klapka ..................... 379/114.18 |
| 5,915,093 | A | | 6/1999 | Berlin et al. ................. 709/219 |
| 6,097,791 | A | * | 8/2000 | Ladd et al. ............... 379/88.19 |
| 6,148,331 | A | | 11/2000 | Parry ........................ 709/218 |
| 6,151,624 | A | * | 11/2000 | Teare et al. ................. 709/217 |
| 6,163,771 | A | * | 12/2000 | Walker et al. ................. 705/18 |
| 6,164,528 | A | * | 12/2000 | Hills et al. ................... 235/379 |
| 6,167,398 | A | * | 12/2000 | Wyard et al. ................... 707/5 |
| 6,173,267 | B1 | | 1/2001 | Cairns ........................ 705/14 |
| 6,178,411 | B1 | * | 1/2001 | Reiter ........................ 705/408 |
| 6,205,433 | B1 | * | 3/2001 | Boesch et al. ................. 705/26 |

(Continued)

FOREIGN PATENT DOCUMENTS

JP        11203560 A    *    7/1999

(Continued)

OTHER PUBLICATIONS

Anon., "Internet's First Pre-Paid Shopping Card Launched," PR Newswire, Sep. 21, 1999.*

(Continued)

*Primary Examiner*—Nicholas D. Rosen
(74) *Attorney, Agent, or Firm*—Robert J. Schaap

(57) ABSTRACT

A method for making on-line purchases includes purchasing a card having a unique identification code and a predetermined cash balance and activating an associated account. Goods or services offered by a seller through a web-site are selected and the identification code provided to the seller who transmits it for verification. If the identification code is associated with the valid and active account and if there is sufficient cash balance in the account, an approval code is sent to the seller, and the purchase price of the selective goods or services is debited from the cash balance of the account. If the identification code is determined invalid, or there is insufficient cash balance, a denial code is transmitted to the seller. As there are low cash balances and no personally identifying or sensitive information associated with the cards, there is little risk in use over the Internet.

20 Claims, 4 Drawing Sheets

U.S. PATENT DOCUMENTS

| | | | |
|---|---|---|---|
| 6,246,757 B1 | 6/2001 | Cai et al. | 379/114.2 |
| 6,467,684 B1* | 10/2002 | Fite et al. | 235/379 |
| 6,505,171 B1* | 1/2003 | Cohen et al. | 705/26 |
| 6,570,964 B1* | 5/2003 | Murveit et al. | 379/67.1 |
| 6,575,361 B1* | 6/2003 | Graves et al. | 235/380 |
| 2001/0032878 A1* | 10/2001 | Tsiounis et al. | 235/379 |
| 2002/0046341 A1* | 4/2002 | Kazaks et al. | 713/182 |
| 2002/0077973 A1* | 6/2002 | Ronchi et al. | 705/39 |
| 2002/0095371 A1* | 7/2002 | Odiwo | 705/39 |
| 2002/0099667 A1* | 7/2002 | Diamandis et al. | 705/74 |
| 2002/0120530 A1* | 8/2002 | Sutton et al. | 705/26 |
| 2002/0143703 A1* | 10/2002 | Razvan et al. | 705/44 |
| 2003/0200179 A1* | 10/2003 | Kwan | 705/65 |
| 2005/0033645 A1* | 2/2005 | Duphily | 705/16 |
| 2005/0160051 A1* | 7/2005 | Johnson | 705/64 |

FOREIGN PATENT DOCUMENTS

WO      WO-0067214 A1 * 11/2000

OTHER PUBLICATIONS

Anon., "InternetCash Micro E-Cash Service Being Developed," Newsbytes News Network, Sep. 29, 1999.*

Wilder, C., "E-commerce Goes Plastic," InformationWeek, Nov. 29, 1999, p. 11.*

Young, J., "Cybermoola," Youth Markets Alert, vol. XI, No. 11, p. 5, Nov. 1999.*

Nelson, K., et al., "Buying Power for the Internet," Bank Systems + Technology, vol. 37, No. 1, p. 20, Jan. 2000.*

Anon., "Credit Cards no Longer Necessary for E-Commerce," Direct Marketing, vol. 62, No. 12, p. 15, Apr. 2000.*

Anon., "InternetCash Gains Ground on Credit Cards," Business Wire, May 17, 2000.*

Tillett, L.S., "Merchants Grapple with Payment Options—Integration Still a Hurdle as Credit-Card Alternatives Emerge," InternetWeek, p. 14, May 22, 2000.*

Anon., "RealStores.com Now Accepting InternetCash for E-Commerce Transactions," Business Wire, p. 2235, Jun. 13, 2000.*

Loughran, S., "ShopRite Converting Greenbacks to E-backs," Supermarket News, vol. 48, No. 34, p. 64, Aug. 21, 2000.*

Bielski, L., "New Wave of E-Money Options Hits the Web," American Bankers Association, ABA Banking Journal, vol. 92, No. 8 p. 39, Aug. 2000.*

Walker, L., "E-Mail Money System Quickly Gains Currency," Washington Post, Thursday, Oct. 12, 2000, Final Chaser edition, p. D2.*

Anon., "Ante up Your 'Cybermoola,'" DSN Supercenter and Club Business, vol. 7, No. 19, p. 6, Oct. 9, 2000.*

Anon., "NYCE Adds its Switch to the Growing Number of Funds Transfer Solutions," ATM and Debit News, vol. 1, No. 5, p. 1, Nov. 16, 2000.*

Martin, Z., "A Dearth of Marketing Power," Credit Card Management, vol. 13, No. 8, pp. 47-52, Nov. 2000.*

Breitkopf, D., "Prepaid Cards Try to Build a Mass Market," American Banker, vol. 166, No. 36, p. 1, Feb. 22, 2001.*

Anon., "Debit Cards Hold Advantages for Supermarkets," PR Newswire, Nov. 21, 1988.*

Anon., "Credit Cards Can Buy Groceries," Leader Herald, Apr. 5, 1992.*

Gage, T.J., "Retail POS Debits Finally Take off," Corporate Cashflow, vol. 14, No. 10, pp. 19-20, Sep. 1993.*

Anon., "Three for All," Card Fax, vol. 96, No. 108, p. 2, Jun. 24, 1996.*

Redman, R., "Interface Enables Phone Downloads," Bank Systems & Technology, vol. 34, No. 12, p. 17, Dec. 1997.*

Anon., "Quick Hits," Debit Card News, Mar. 31, 1999.*

Anon., "Solutran Offers E-Commerce Payment Alternative," Card News, vol. 15, No. 14, uly 12, 2000.*

Anon., "New Fujitsu TeamPad 500 Adds Color, Integrated Printer/REader for Powerful, Lightweight Route Management Capabilities," Business Wire, Nov. 16, 2000.*

Anon, "DataWave TeleCard Machines Provide New Business Venue" (Abstract), Vending Times, p. 49, Apr. 14, 1995.*

* cited by examiner

METHOD OF USING PREPAID CASH CARD FOR MAKING PURCHASES ON THE WORLD WIDE WEB

RELATED APPLICATION

This application claims priority from Provisional Application Ser. No. 60/282,382, filed Apr. 6, 2001.

BACKGROUND OF THE INVENTION

The present invention generally relates to purchasing goods and services over the Internet. More particularly, the present invention relates to a prepaid cash card which is used as a substitute to conventional credit cards for secure commercial transactions over the Internet.

The Internet is a global computer super-network consisting of numerous sub-networks. The majority of users connect their computers to the Internet indirectly via a standard analog telephone connection or a digital services connection to an Internet service provider, whose computer is more directly connected to the Internet or one of its sub-networks. The Word Wide Web is a distributed hyper media system in which multimedia information, such as combinations of text, still or moving images, and sound, is transferred via the Internet in accordance with hypertext transfer protocol. Oftentimes the terms Internet and World Wide Web are used interchangeably. A software product known as a browser, executing on a user's computer, is used to retrieve the information and cause the user's computer to display it. An Internet service provider may provide a browser to its subscribers that is integrated with the communication software. The Internet is a client-server system in which the users remote computer operating under a controlled browser constitutes a client platform that requests hypertext documents, and the host computer operating under control of its own software constitute a server platform that provides the documents in response to the client's request.

A user may purchase goods or services via the Internet. The term "electronic commerce" is commonly used to refer to such transactions. Merchants may provide information and offers regarding their products or services in the form of hypertext documents, known as web-sites, that they publish on the World Wide Web. Hundreds of millions of dollars per year are spent in the U.S. on purchasing items and services over the Internet. Due to the very nature of the Internet, a company may be based hundreds or even thousands of miles away from the purchaser. This presents a problem in that without company name recognition, the potential purchaser is unsure of the reputation of the company. Also, the company may not have a traditional brick and mortar site in which customers visit to purchase similar goods and services, but rather simply a web presence.

Due to the nature of the Internet, the vast majority of commercial transactions occur by providing credit card information, including credit card number and expiration date of the credit card, on a hypertext form or field and transmitting the information to the merchant's server. Once approved, the product may be shipped to the user by conventional means, or it may be delivered electronically via the Internet itself in the case of software or other services provided over the World Wide Web. A similar process is used for those merchants that accept debit cards. Debit cards are commonly used to pay for retail goods, telephone calls, highway tolls, restaurant meals, etc. Although the debit card may have a low credit balance, typically the debit card is associated with an account into which money is deposited by the holder of the debit card. In order to obtain either a credit card or a debit card, an application is typically filled out and submitted which includes personally identifying information such as telephone number, address information, social security number, annual income, family members names, etc.

While most purchases present no problems, occasionally a purchaser will attempt to purchase goods or services from an unscrupulous company which in reality has no goods or services but is merely defrauding consumers. Such companies obtain the credit card information and use it for cash advances, unauthorized purchases, etc. Additionally, there is an overreaching concern of privacy on the Internet. For example, those who are technologically savvy may pull off information from the data lines or from databases which have been accessed without authorization. These thieves who intercept or otherwise procure this information can likewise use the credit card information to make purchases, etc. Many credit cards offer a spending limit of several thousand dollars. However, if the card number is stolen, the consumer may only have to pay a small fee (typically less than $200.00), although the credit card issuing company and the companies from which fraudulent purchases are made stand to lose an enormous amount of money from such fraudulent transactions.

Perhaps of equal concern is the providing of credit card information and other personal information to reputable companies who then sell the personal information to marketing firms, telemarketers and others. This can result in a tremendous amount of "junk mail" and unsolicited telephone calls to the purchaser who provided such information during a single transaction with one company, but who is contacted subsequently by many other companies in which the purchaser may have no interest.

Accordingly, there is a need for a system which allows purchases over the Internet with the same convenience and ease as with the use of credit or debit cards, while protecting the monetary and privacy interests of the purchaser. The present invention fulfills these needs and provides other related advantages.

SUMMARY OF THE INVENTION

The present invention resides in a method for making purchase transactions over the World Wide Web without any personally identifying information, such as telephone number, social security number, date of birth, annual income, etc., commonly associated with traditional credit and debit cards. A card is purchased having a unique identification code, and a predetermined cash balance. An obstruction, such as a peel-away strip, covering the identification code is removed after purchasing the card.

An account is activated or created by providing the identification code to a card service system. Typically, only the identification code is provided to the card service system in order to protect the purchaser of the card from uninvited sales calls, junk mail, theft of personal identity, etc. The activating step may comprise calling the card service system by telephone and providing the identification code, such as by inputting the identification code via keystrokes of a keypad of the telephone when prompted by an automated system, or providing the identification code by voice when the automated system has voice recognition software. Alternatively, the card holder may enter the identification code into a designated field of a card service web-site to activate or create an associated account.

In order to purchase goods or services, the card holder selects one or more goods or services offered by a seller through its web-site. The identification code of the card is provided to the seller, typically by entering the identification code into a designated field of the web-site. The seller then transmits the identification code to the card service system for verification. The card service system determines if the identification code is associated with the valid and active account, and if there is sufficient cash balance in the account to purchase the selected goods or services. This is done by searching a database of activated accounts.

An approval code is transmitted to the seller if the identification is valid and a sufficient cash balance is available in the associated account to purchase the selected goods or services. The seller is credited the value of the purchase price of the selected goods or services, and the purchase price of the selected goods or services are debited from the cash balance of the account. If it is determined that the identification code is invalid, or there is insufficient cash balance in the associated account to purchase the selected goods or services, a denial code is transmitted to the seller.

The card holder can determine current card account cash balance by contacting the card service system, such as by telephone or World Wide Web connection. It is contemplated that the cash balance from one card account can be transferred to another card account when contacting the card service system so that meaningless low cash balances do not remain in an account.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
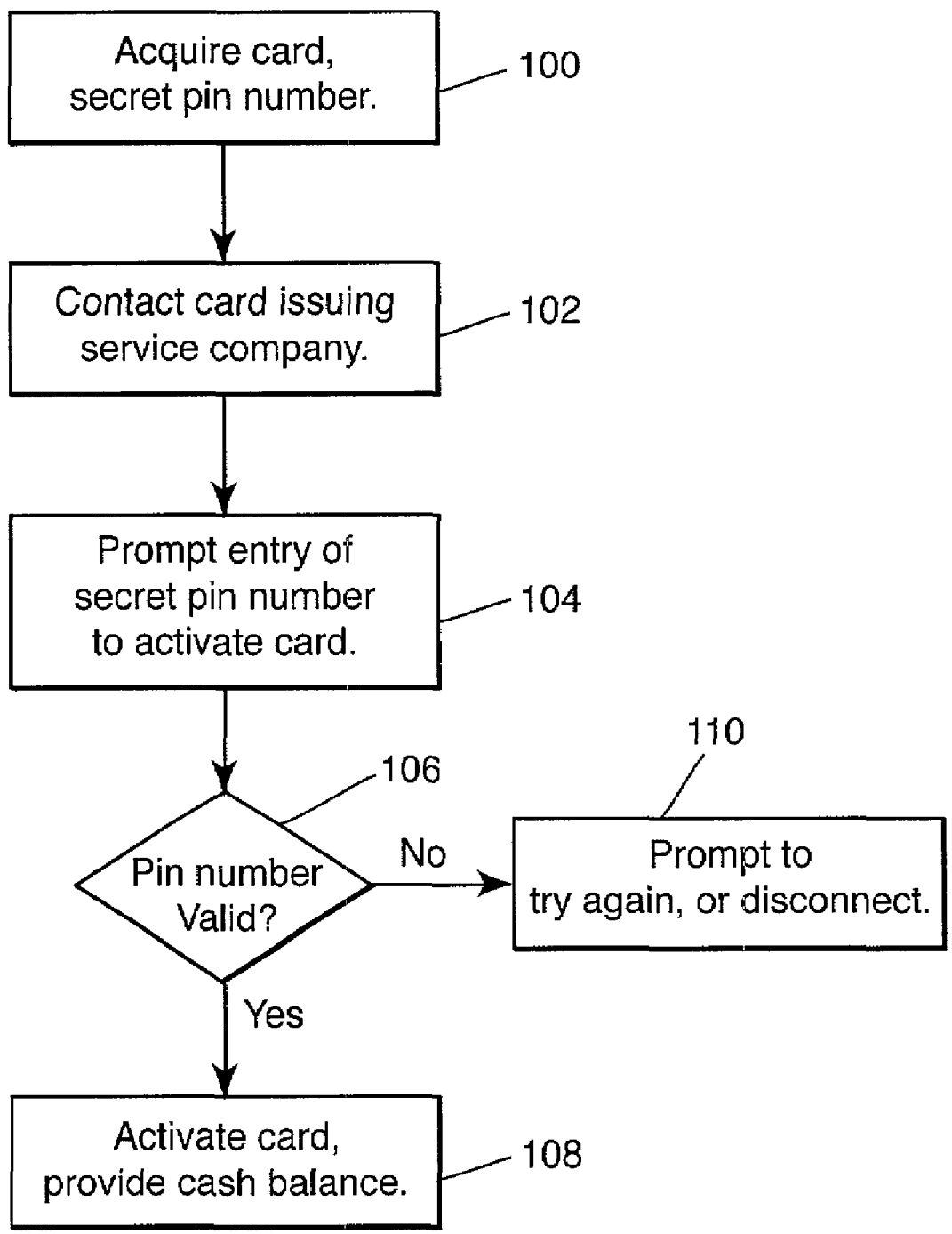
FIG. 1 is a flow chart illustrating the steps taken in acquiring and activating a card in accordance with the present invention.

As shown in the drawings for purposes of illustration, the present invention is concerned with a method for making purchase transactions over the World Wide Web using a prepaid cash card.

With reference to FIG. 1, a card is acquired having a secret identification code or pin number (100). The card is similar to a prepaid telephone card. On one side thereof will be imprinted various designs, trademarks, etc. On the other side of the card is imprinted with information regarding instructions for use, a web-site address of the card issuing company or a telephone number of the card issuing company, the secret identification number obscured by a peel-away strip, scratch-off foil treatment, or the like to prevent one from determining the identification number until purchase.

The cards are issued in different dollar denominations, each card having a corresponding cash balance in a relatively small amount, such as $20.00, $50.00, $100.00. The cards are typically placed within retail stores, such as grocery stores, gasoline stations, and other retail outlets, which have agreed to carry the cards. Although these stores may include means for activating the cards upon purchase, such as by scanning a bar code or swiping a magnetic strip on the card, in a particularly preferred embodiment the purchaser of the card must contact the card issuing company in order to activate an account associated with the card.

Thus, after acquiring and purchasing the card and removing the obstruction covering the identification code, the card issuing company, or card service system is contacted (102). The card service system or company may be contacted by telephone in which an operator requests the identification code in order to activate the corresponding account. In a particularly preferred embodiment, the system is automated and the owner of the card activates the account by inputting the identification code via keystrokes of a keypad of the telephone when prompted, or speaking into the telephone when prompted by the automated system having voice recognition software. Alternatively, the owner of the card may log onto the Internet, and enter the identification code into a designated field of the card issuing service system's web-site (104).

Figure 3:
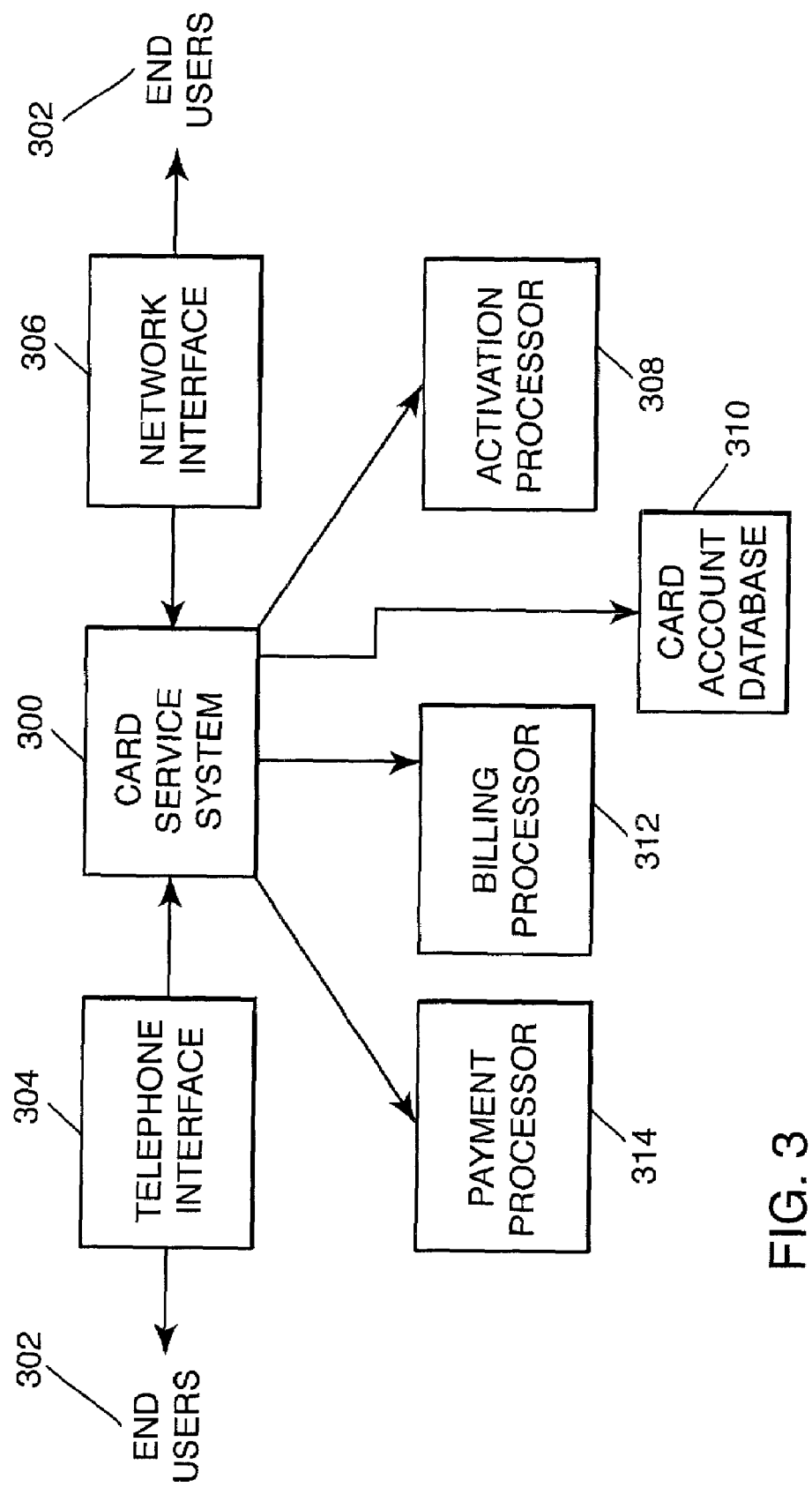
FIG. 3 is a schematic block diagram illustrating connection to a card service system, and various processors and databases used by the card service system in accordance with the present invention.

With reference to FIG. 3, a schematic diagram illustrates possible architecture of such a system. The card service system (300) is accessed by end users (302), either cardholders or sellers, using either the telephone interface (304) or the Internet network interface (306), as described above. Upon contacting the card service system (300) and inputting the secret identification or pin number (104), an activation processor (308) searches a card account database (310) to match the provided identification code with a previously generated account, or an account is created.

Referring back to FIG. 1, if it is determined that the identification pin number is valid (106), the card is activated, and the system provides the current cash balance (108). However, if the identification code or pin number is determined to be invalid, the end user purchaser of the card (302) is prompted to try again. A preset number of attempts can be provided in any given call, before the system automatically disconnects (110).

There are several methods of making the invention profitable for those involved in providing the cards, such as retail stores, and the service companies involved in the purchase transactions and monitoring of the card accounts. One method is to charge an up-front service fee when purchasing the card. Another is to charge such a service fee upon activation of the card, which can be a preset amount or percentage of the cash balance. Yet another method is to charge those companies offering purchases to be made using the invention on their web-sites.

Typically, when obtaining a credit card or debit card, personal information is given to the company in the form of an application in order to receive the card. Such information can include social security number, date of birth, full name, address, telephone number, annual income, etc. which the holder of the card may consider to be private and sensitive. Due to the fact that typically only the unique identification number associated with the card is provided to activate the card account, no such personal information is obtainable by acquiring the card or card number through deception, theft, fraud, etc. When making purchases on the Internet, as described herein, such companies will only be provided limited information, such as shipping address to provide the goods or services purchased. Other personally identifying and sensitive information will not be provided to the company and will alleviate the unauthorized transfer of personal information, harassing telemarketing calls, junk mail, etc. Those sellers offering goods and services through the Internet may realize the benefit of the invention in potential increased Internet sales and pay an annual service fee, or a small transaction fee each time a purchase is made, using the present invention.

Credit card fraud is a growing problem and results in tremendous losses to credit card issuing companies. Often, the holder of the credit or debit card is limited in liability to a few hundred dollars, even though several thousand dollars worth of merchandise and services may have been purchased using the stolen card or card number. Credit card issuing companies lose millions of dollars annually due to such credit card theft. Such companies might be interested in incorporating the present invention in their product line as the holder of the card is limited in liability and loss to only the current cash balance remaining on the card, typically less than $100. Even if the card was stolen or lost, the card issuing company would have no liability. A process could be initiated wherein an active card account could be deactivated and given a new identification code in the event of card theft, in order to limit the financial loss of the purchaser of the cards as much as possible.

Figure 2:
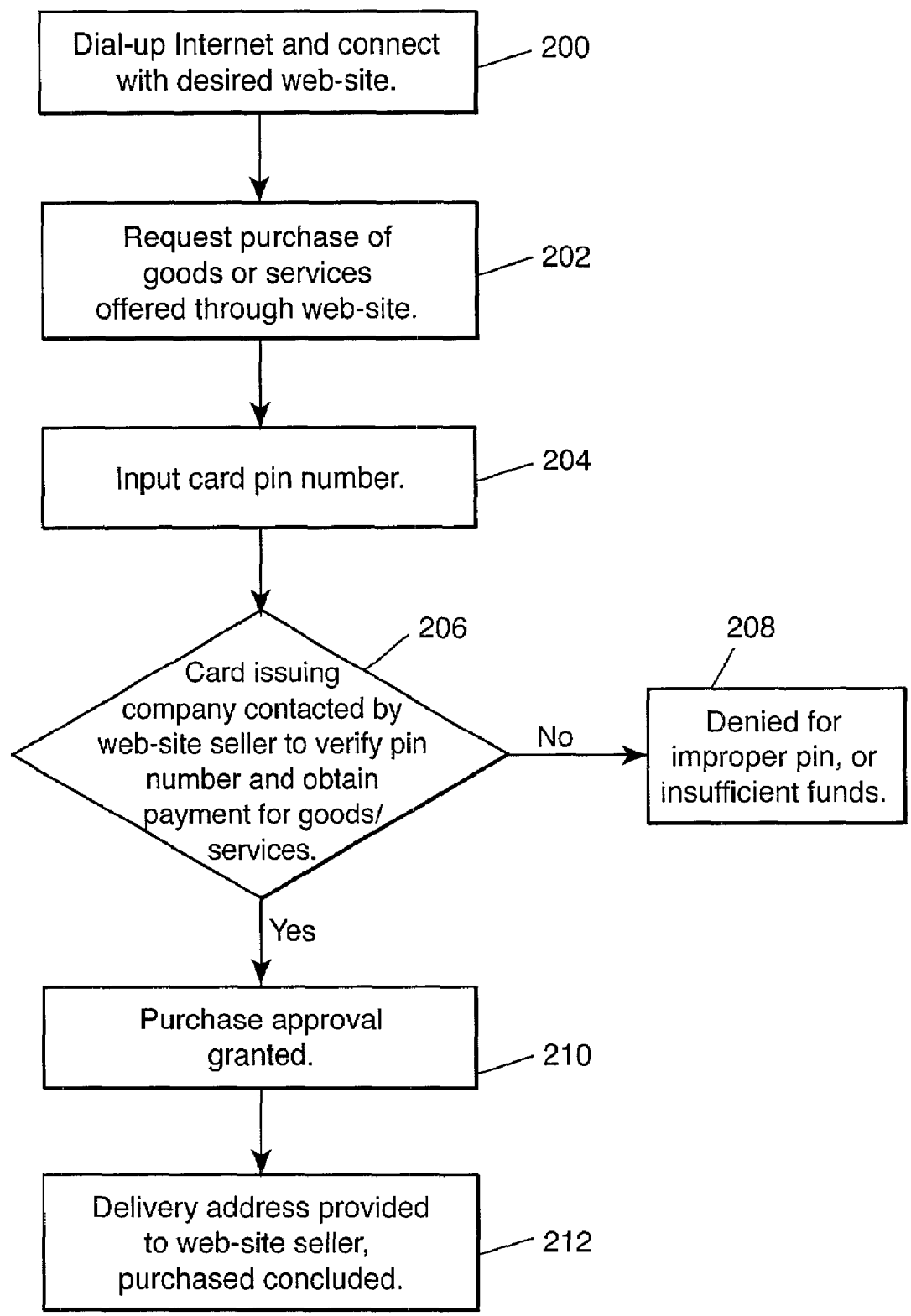
FIG. 2 is a flow chart illustrating the steps taken in making a purchase over the World Wide Web using the prepaid cash card of the present invention.

With reference now to FIG. 2, in order to make purchase transactions over the Internet, otherwise known as the World Wide Web, the cardholder connects with a desired web-site (200). The holder of the card then selects various goods or services and requests purchase of these through the web-site (202). Instead of providing credit card and other personal information, the user inserts the prepaid cash card identification code or pin number into a designated field on the web-site (204). The web-site seller then contacts the card issuing company, such as by network connection, and transmits the provided identification code to verify the identification code and obtain payment for goods and/or services (206). The card service system determines if the identification code provided is associated with a valid and active account by searching the card account database (310), or another database of activated accounts, and then determines if there is a sufficient cash balance in the account to purchase the selected goods or services.

A denial code is transmitted to the seller if the identification code is determined to be invalid or there is insufficient cash balance in the associated account to purchase the selected goods or services (208). However, if the identification code is determined to be valid and a sufficient cash balance is available in the associated account to purchase the selected goods or services, an approval code is sent to the seller granting approval of the purchase (210). Necessary information, such as delivery address, is provided to the web-site seller, and the purchase is concluded (212).

Figure 4:
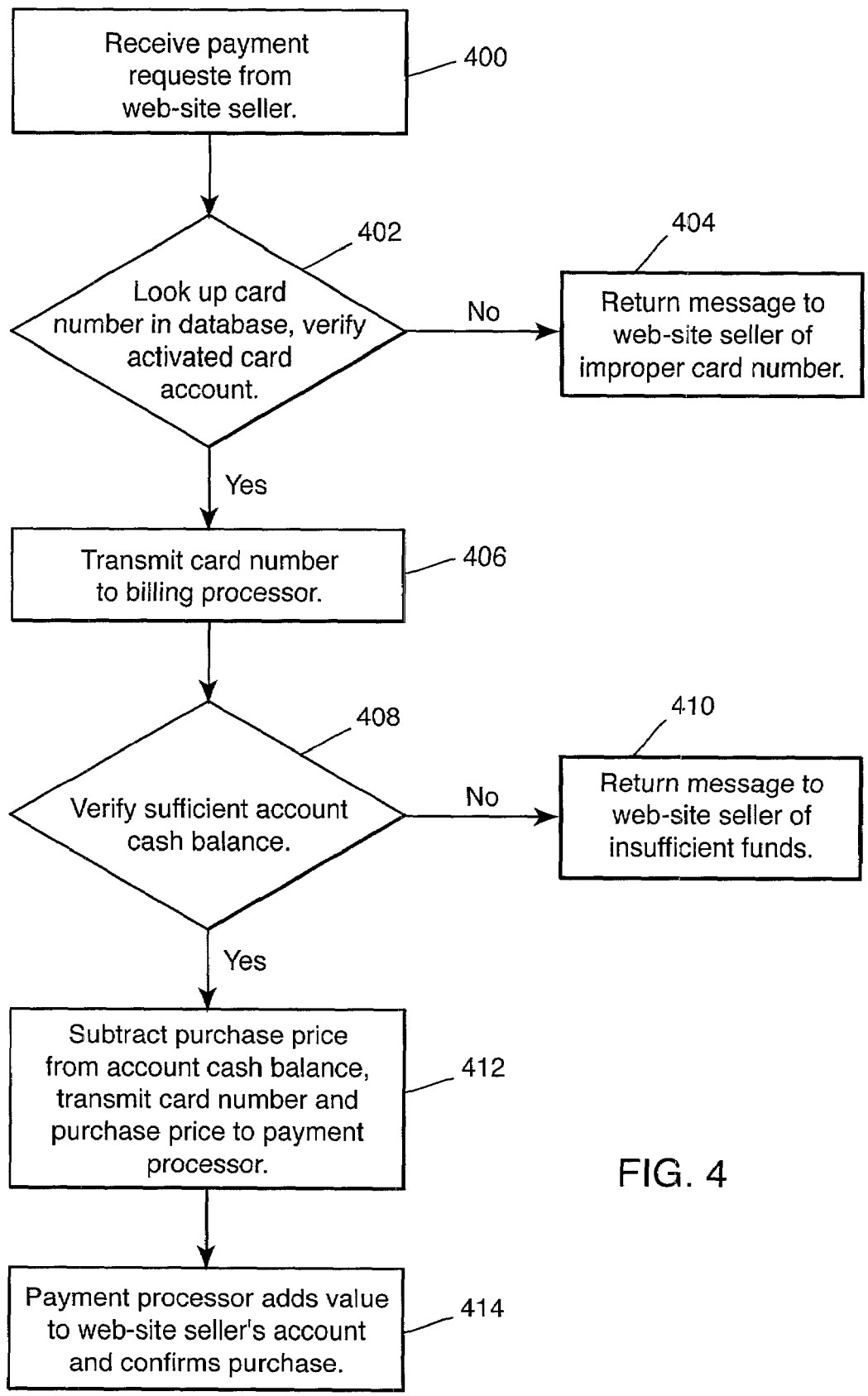
FIG. 4 is a flow chart illustrating the steps taken in verifying and fulfilling a purchase request from a merchant.

With reference now to FIGS. 3 and 4, the above process is provided in more detail. During the purchase transaction, a receive payment request from the web-site seller (400) and cardholder provided identification code is received by the card service system (300). The identification code/card number is searched in the database (310) and verified to represent an activated card account (402). If not, the system can be designed to return a message to the web-site seller of an improper card identification code (404). However, if the identification code provided corresponds to an activated card account, the card number is transmitted to a billing processor (406).

FIG. 3 illustrates a billing processor (312) and payment processor (314) as part of the card service system (300) which are used in this process. The billing processor (312), or other component of the system (300) verifies that the account has a sufficient cash balance (408). If not, the system can be designed to return a message to the web-site seller that the account has insufficient funds (410). However, if there are sufficient funds in the account, the purchase price is subtracted from the account cash balance, the purchase price and card number are transmitted to the payment processor (412), and the payment processor (314) adds value to the web-site seller's account and confirms the purchase (414). The above-described process is similar to that used in current e-commerce transactions, and can be modified as necessary to meet the technological requirements of various systems.

After the transaction, if the card holder has a remaining balance, the card holder can conduct additional commercial transactions in a similar fashion. In the event that the card holder has not kept track of the balance of the card account, or has otherwise forgotten, the card holder may contact the card service system, as described above, to obtain the current cash balance of the account. While optimally this can be done in real time, realistically several hours or even a day or two may be necessary before providing a correct current balance between commercial transactions. Upon reaching a zero balance, the corresponding card account will be closed. As it is anticipated that there may, after several commercial transactions, remain only minimal cash balance on any given card account, the invention thus contemplates transferring balances from one card account to another card account so that Internet purchases can be made using a single account identification code number. This can be accomplished using the card service system web-site or telephone system and following the prompts or filling in the designated fields as directed.

As can be appreciated by the reader, due to the fact that there is no accompanying personal information with such transactions, even if a would be thief were to intercept the information over the network lines or gain unauthorized access into the database, the thief would only be able to use the balance of that particular card account. Due to the fact that the card accounts are provided in relatively small dollar values, risk is significantly minimized to all parties. Also, identity theft is virtually eliminated. The invention provides an enormous benefit not only to the holder of the card, which protects his or her privacy and limits his or her financial loss, but also benefits the companies which issued the prepaid cards and those companies providing the goods and services as the risk of loss due to fraudulent use of the card is eliminated and the goods and services will always be paid for without loss to prepaid cash card issuer or service system.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A method for making purchase transactions over the world wide web, comprising the steps of:

purchasing a card having a unique identification code and a predetermined cash balance;

activating an account associated with the card by providing only the identification code and not any personally identifying information to a card service system;

selecting one or more goods or services offered by a seller through a web-site;

providing the identification code of the card to the seller who then transmits the identification code to the card service system for verification, wherein the verification by the card service system includes the steps of determining if the identification code is associated with a valid and active account by searching a database of activated accounts, and if there is sufficient cash balance in the account to purchase the selected goods or services; and transmitting an approval code to the seller if the identification code is valid and a sufficient cash balance is available in the associated account to purchase the selected goods or services, or transmitting a denial code to the seller if the identification code is determined invalid or there is insufficient cash balance in the associated account to purchase the selected goods or services; and debiting the purchase price of the selected goods or services from the cash balance of the account when an approval code is transmitted.

2. The method of claim 1, including the step of removing an obstruction covering the identification code after purchasing the card.

3. The method of claim 2, including the step of removing a peel-away strip covering the identification code.

4. The method of claim 1, wherein the activating step includes calling the card service system by telephone and providing the identification code.

5. The method of claim 4, wherein the activating step includes inputting the identification code via keystrokes of a keypad of the telephone when prompted by an automated system.

6. The method of claim 4, wherein the activating step includes an automated system having voice recognition software and the identification code is provided by voice.

7. The method of claim 1, wherein the activating step includes entering the identification code into a designated field of a card service system web-site.

8. The method of claim 1, including the step of crediting the seller with the value of the purchase price at the selected goods or services when debiting the cash balance of the card account.

9. The method at claim 1, including the step of a cardholder determining current card account cash balance by contacting the card service system.

10. The method of claim 9, including the step of transferring a minimal cash balance from one card account of a cardholder to another card account of the cardholder by contacting the card service system.

11. A method for making purchase transactions over the world wide web, comprising the steps of;

purchasing a card having a unique identification code and a predetermined cash balance;

removing an obstruction covering the identification code after purchasing the card;

activating an account associated with the card by calling the card service system by telephone and providing only the identification code and not any personally identifying information;

selecting one or more goods or services offered by a seller through a web-site;

providing the identification code of the card to the seller by entering the identification code into a designated field of the web-site, who then transmits the identification code to the card service system for verification;

determining if the identification code is associated with a valid and active account and if there is a sufficient cash balance in the account to purchase the selected goods or services; and transmitting an approval code to the seller if the identification code is valid and a sufficient cash balance is available, and crediting the seller with the value of the purchase price of the selected goods or services and debiting the purchase price of the selected goods or services from the cash balance of the account, or transmitting a denial code if the identification code is invalid or there is insufficient cash balance in the associated account to purchase the selected goods or services.

12. The method of claim 11, including the step of removing a peel-away strip covering the identification code.

13. The method of claim 11, wherein the activating step includes inputting the identification code via keystrokes of a keypad of the telephone when prompted by an automated system.

14. The method of claim 11, wherein the activating step includes an automated system having voice recognition software and the identification code is provided by voice.

15. The method of claim 11, wherein the determining step includes searching a database of activated accounts.

16. The method of claim 11, including the step of a cardholder determining current card account cash balance by contacting the card service system.

17. The method of claim 16, including the step of transferring a minimal cash balance from one card account of a cardholder to another card account of the cardholder by contacting the card service system.

18. A method for making purchase transactions over the world wide web, comprising the steps of:

purchasing a card having a unique identification code and a predetermined cash balance;

removing an obstruction covering the identification code after purchasing the card;

activating an account associated with the card by entering only the identification code into a designated field of a card service system web-site without any personally identifying information;

selecting one or more goods or services offered by a seller through a web-site;

providing the identification code of the card to the seller by entering the identification code into a designated field of the seller's web-site, who then transmits the identification code to the card service system for verification;

determining if the identification code is associated with a valid and active account and if there is a sufficient cash balance in the account to purchase the selected goods or services;

transmitting an approval code to the seller if the identification code is valid and a sufficient cash balance is available, and crediting the seller the value of the value of the purchase price of the selected goods or services and debiting the purchase price of the selected goods or services from the cash balance of the account, or transmitting a denial code if the identification code is invalid or there is insufficient cash balance in the associated account to purchase the selected goods or services;

a cardholder determining current card account cash balance by contacting the card service system; and transferring a minimal cash balance from one card account of the cardholder to another card account of the cardholder by contacting the card service system.

19. The method of claim 18, including the step of removing a peel-away strip covering the identification code.

20. The method of claim 18, wherein the determining step includes searching a database of activated accounts.

* * * * *